(12) United States Patent
Natarajan et al.

(10) Patent No.: US 6,413,339 B1
(45) Date of Patent: Jul. 2, 2002

(54) LOW TEMPERATURE SINTERING OF FERRITE MATERIALS

(75) Inventors: Govindarajan Natarajan, Pleasant Valley; Jon A. Casey; Martin E. Klepeis, both of Poughkeepsie; John U. Knickerbocker, Hopewell Junction; Srinivasa S. N. Reddy, Lagrangeville; Robert A. Rita, Wappingers Falls; Subhash L. Shinde, Cortland Manor, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,457

(22) Filed: Dec. 22, 1999

(51) Int. Cl.[7] ........................ B32B 31/16; B32B 31/26; H01F 7/02
(52) U.S. Cl. ................. 156/89.11; 156/89.12; 156/252; 156/253; 445/23
(58) Field of Search ............... 156/89.11, 252, 156/253, 89.12; 445/23; 419/8, 26, 38

(56) References Cited

U.S. PATENT DOCUMENTS

| | | | |
|---|---|---|---|
| 4,388,131 A | * | 6/1983 | Unger et al. |
| 4,457,464 A | * | 7/1984 | Forterre et al. |
| 4,540,500 A | * | 9/1985 | Torii et al. |
| 5,349,743 A | * | 9/1994 | Grader et al. |
| 5,772,820 A | * | 6/1998 | Schoch, Jr. et al. |
| 5,857,883 A | * | 1/1999 | Knickerbocker et al. |
| 6,120,917 A | * | 9/2000 | Eda |
| 6,162,311 A | * | 12/2000 | Gordon et al. |
| 6,264,885 B1 | * | 7/2001 | Knickerbocker et al. |

FOREIGN PATENT DOCUMENTS

EP  0 877 396  * 11/1998

* cited by examiner

Primary Examiner—Curtis Mayes
(74) Attorney, Agent, or Firm—Margaret A. Pepper

(57) ABSTRACT

The present invention relates generally to a new metal/magnetic-ceramic laminate with through-holes and process thereof. More particularly, the invention encompasses a new process for fabrication of a large area ceramic laminate magnet with a significant number of holes, integrated metal plate(s) and co-sintered electrodes for electron and electron beam control. The present invention also relates to a magnetic matrix display (MMD), and electron beam source, and methods of manufacture thereof.

29 Claims, 1 Drawing Sheet

LOW TEMPERATURE SINTERING OF FERRITE MATERIALS

FIELD OF THE INVENTION

The present invention relates generally to a new metal/magnetic-ceramic laminate with through-holes and such magnetic-ceramic materials as low temperature sintered ferrites and process thereof. More particularly, the invention encompasses new sintering aids for low temperature sintering of ferrites and process for fabrication of a large area ceramic laminate. The present invention also relates to a magnetic matrix display (MMD) electron beam source, and methods of manufacture thereof.

BACKGROUND OF THE INVENTION

A magnetic matrix display is particularly, although not exclusively, useful in display applications, especially flat panel display applications. Such flat panel display applications include television receivers, visual display units for computers, especially, although not exclusively, portable and/or desktop computers, personal organizers, communications equipment, wall monitor, portable game unit, virtual reality visors and the like. Flat panel display devices based on a magnetic matrix electron beam source hereinafter may be referred to as Magnetic Matrix Displays (MMD).

Conventional flat panel displays, such as liquid crystal display panels, and field emission displays, provide one display technology. However, these conventional flat panel displays are complicated and costly to manufacture, because they involve a relatively high level of semiconductor fabrication, delicate materials, and high tolerance requirements.

U.S. Pat. No. 5,917,277, (Knox, et al.), issued on Jun. 29, 1999, entitled "ELECTRON SOURCE INCLUDING A PERFORATED PERMANENT MAGNET", assigned to International Business Machines Corporation, Armonk, N.Y., USA, the assignee of the instant Patent Application and the disclosure of which is incorporated herein by reference, discloses a magnetic matrix electron source and methods of manufacture thereof. Also disclosed is the application of the magnetic matrix electron source in display applications, such as, for example, flat panel display, displays for television receivers, visual display units for computers, to name a few. Also disclosed is a magnetic matrix display having a cathode for emitting electrons, a permanent magnet with a two dimensional array of channels extending between opposite poles of the magnet, the direction of magnetization being from the surface facing the cathode to the opposing surface. The magnet generates, in each channel, a magnetic field for directing electrons from the cathode means into an electron beam. The display also has a screen for receiving the electron beam from each channel. The screen has a phosphor coating facing the side of the magnet remote from the cathode, the phosphor coating comprising a plurality of pixels each corresponding to a different channel. There are grid electrode means disposed between the cathode means and the magnet for controlling the flow of electrons from the cathode means into each channel. The two dimensional array of channels are regularly spaced on an X-Y grid. The magnet area is large compared with its thickness. The flat panel display devices based on a magnetic matrix electron source is referred to as MMD (Magnetic Matrix Display).

The permanent magnet is used to form substantially linear, high intensity fields in the channels or magnetic apertures for the purpose of collimating the electrons passing through the aperture. The permanent magnet is insulating, or at most, has a low conductivity, so as to allow a field gradient along the length of the aperture. The placement of the beam so formed, on the phosphor coating, is largely dependent on the physical location of the apertures in the permanent magnet.

In operation, these electron beams are directed at a phosphor screen and collision of the electron beam with the phosphor results in light output, the intensity being proportional to the incident beam current (for a fixed final anode voltage). For color displays, three different colored phosphors (such as red, green and blue) are used and color is obtained by selective mixing of these three primary colors.

For accurate color reproduction, the location of the electron beams on the appropriate colored phosphor is essential. Some degree of error may be tolerated by using "black matrix" to separate the different phosphors. This material acts to delimit individual phosphor colors and also enhances the contrast ratio of the displayed image by making the display faceplate appear darker. However, if the electron beam is misplaced relative to the phosphor, initially the light output from the phosphor is reduced (due to loss of beam current to the black matrix) and this will be visible as a luminance non-uniformity. If the beam is subject to a more severe placement error, it may stray onto a different colored phosphor to that for which it was intended and start to produce visible quantities of light output. Thus the misplaced electron beam is actually producing the wrong light output color. This is called a purity error and is a most undesirable display artifact. For a 0.3 mm pixel, typical phosphor widths are 67 $\mu$m with 33 $\mu$m black matrix between them.

It will be apparent that a very precise alignment is required between the magnet used to form the electron beams and the glass plate used to carry the phosphors that receive the electron beams. Further, this precise alignment must be maintained over a range of different operating conditions (high and low brightness, variable ambient temperature etc).

A number of other magnet characteristics are also important when considering application for a display, such as, for example:

(a) It is generally accepted that the displayed image is formed by a regular array of pixels. These pixels are conventionally placed on a square or rectangular grid. In order to retain compatibility with graphics adaptors the magnet must thus present the electron beams on such an array.

(b) In operation, the spacing between the grids used for bias and modulation of the electron beam and the electron source determines the current carried in the electron beam. Variations of this spacing will lead to variations in beam current and so to changes in light output from the phosphor screen. Hence it is a requirement that the magnet, which is used as a carrier for these bias and modulation grids, maintain a known spacing to the electron source. To avoid constructional difficulties, the magnet should be flat.

(c) The display will be subject to mechanical forces, especially during shipment. The magnet therefore must retain structural integrity over the allowable range of stresses it may encounter. A commonly accepted level is an equivalent acceleration of about 30 G (294 ms$^{-2}$).

(d) Since the magnet is to be used within the display, which is evacuated, it should not contain any organic components which may be released over the life of the display thereby degrading the quality of vacuum or poisoning the cathode.

(e) The magnet should be magnetized in the direction of the apertures, that is the poles correspond to the faces of the magnet.

The manufacture of such a magnet that satisfies the above conditions is not possible by the use of previously known manufacturing methods. Certainly a magnet (ferrite, for example) of the desired size without apertures is readily obtainable but the presence of the apertures causes some problems.

If the apertures in the magnet are to be formed after the ferrite plate has been sintered, either laser or mechanical drilling may be used. However, the sintered ferrite is a very hard material and forming the apertures by this technique will be a costly and lengthy process—unsuitable for a manufacturing process.

Therefore, preferably holes could be formed in the ferrite at the green state before sintering by known punching/drilling methods typical of multi-layer ceramics for microelectronics applications. However, during sintering a number of problems would be anticipated, such as, for example:

The magnet plate will be subject to uneven shrinkage leading to the holes "moving"—an unequal radial displacement from their nominal positions;

The magnet itself is likely to "bow" such that it forms a section of a large diameter sphere;

Cracking is likely to occur between adjacent apertures due to the apertures acting as stress concentrators; or If, to obtain the desired aperture length, multiple thin sheets are stacked on top of one another, misalignment may occur in stacking which could lead to no "line of sight" through the apertures.

A further problem is that ferrite is a hard but not a tough material, and the presence of the apertures significantly reduces the mechanical strength of the plate. Thus, during shipment when large shocks may be encountered, complete mechanical failure of the magnet is a distinct possibility.

Hence, it may be necessary to use metal carriers both for mechanical strength and hole positional accuracy. In such a situation, the high temperature stability of the metal carrier materials of choice in the oxidizing sintering ambient needed for ferrite sintering dictates that the sintering temperatures of these materials to below about 1,000° C. or even lower. Similarly, the inventive sintering aids for these ferrites also need to produce a dense ferrite with coefficient of thermal expansion (CTE) of about $10 \times 10^{-6}/°$ C. The sintering aids should be such that they do not degrade the magnetic properties of the ferrites.

However, typical sintering temperature for Barium or Strontium or Ba—Sr ferrites is above 1300° C., therefore efforts have to be made to reduce the sintering temperature or develop materials that will meet the requirements of such applications.

U.S. Pat. No. 4,138,236 discloses a method of bonding hard and/or soft magnetic ferrite parts with an oxide glass. The oxide glass may be applied prior to or after pre-firing or main firing. Finally, the ferrite parts are fused at temperatures in excess of the glass softening point.

U.S. Pat. No. 4,540,500 discloses a low temperature sinterable oxide magnetic material prepared by adding 0.1 to 5.0 percent by weight of glass to ferrite. In some situations, the sintering temperature can be reduced to about 1,000° C. or less.

U.S. Pat. No. 4,023,057 discloses a compound magnet for a motor stator having a laminated structure that includes thin, flexible magnets made from permanently magnetizable particles, such as barium ferrite, that are embedded in a flexible matrix, such as rubber. Various laminated arrangements are contemplated for producing more intense magnetic fields and thin metal spacers are used in most laminated structures to collapse the respective fields of the flexible magnetic components to increase the flux density at the resultant poles and to orient the permanent magnetic fields in the magnetic circuit of the motor.

Published Japanese Patent Application No. JP60093742 discloses a display having a focus electrode with a conductive magnetic body and a sputtered metal coating on one surface of the magnet body. The conductivity is required for the focusing electrode to perform its function. The coating is sputtered and so is a thin coating, not substantially adding to the mechanical structure of the magnet. Each of the holes in the magnet has a number of electron beams passing through it.

U.S. Pat. No. 5,932,498, (Beeteson, et al.), issued on Aug. 3, 1999, entitled "MAGNET AND METHOD FOR MANUFACTURING A MAGNET", assigned to International Business Machines Corporation, Armonk, N.Y., USA, the assignee of the instant Patent Application and the disclosure of which is incorporated herein by reference, discloses a magnet-photosensitive glass composite and methods thereof.

U.S. Pat. No. 5,857,883, (Knickerbocker et al.), entitled "Method of Forming Perforated Metal/Ferrite Laminated Magnet", assigned to International Business Machines Corporation, Armonk, N.Y., USA, the assignee of the instant Patent Application and the disclosure of which is incorporated herein by reference, discloses a process for fabrication of a large area laminate magnet with a significant number of perforated holes, integrated metal plate(s) and electrodes for electron and electron beam control.

PURPOSES AND SUMMARY OF THE INVENTION

The invention is a novel low temperature sintering aid for ferrites and process for metal/magnetic-ceramic laminate with through-holes.

Therefore, one purpose of this invention is to provide a low temperature sintering aid for a magnetic-ceramic and a process that will form metal/magnetic-ceramic laminate.

Another purpose of this invention is to provide a low temperature sintering aid for a magnetic-ceramic and a process that will provide metal/magnetic-ceramic laminate with through-holes.

Yet another purpose of this invention is to use the metal/magnetic-ceramic laminate as a mask to create an image on at least one glass plate to form multi-phosphors (red, green, blue) material which receives an electron beam to create a display.

Still another purpose of this invention is to provide a low temperature sintered ferrite structure through which one or more collimated beam(s) of electrons can be formed using the ceramic/magnetic laminate.

Yet another purpose of this invention is to provide a low temperature sintered ferrite structure that can be used with any electron sensitive process.

Still yet another purpose of the invention is to provide a laminated metal/magnetic-ceramic that has a plurality of openings for guiding electrons and/or electron beams.

Still yet another purpose of the invention is to have a sintering aid in metal/magnetic-ceramic structure to allow lower temperature sintering.

Therefore, in one aspect this invention comprises a process of forming unsintered metal/ferrite laminate magnet, comprising:

(a) forming at least one opening in an metal sheet having a first surface and a second surface, (b) securing at least one dielectric layer to at least a portion of said first surface of said metal sheet, (c) securing at least one ceramic magnet layer containing at least one low temperature sintering aid to at least a portion of said at least one dielectric layer, (d) forming at least one opening through said ceramic magnet layer and said dielectric layer, such that at least a portion of said opening overlaps at least a portion of said opening in said metal sheet, and thereby forming said unsintered metal/ferrite laminate magnet.

In another aspect this invention comprises a ceramic-metallic magnet comprising at least one ceramic-magnetic sheet, wherein said sheet has at least one low temperature sintering aid.

In still another aspect this invention comprises a ceramic-metallic magnet comprising at least one ceramic magnet sheet, wherein said sheet has at least one low temperature sintering aids and at least one adhesion promoter to form a metal-to-magnetic-ceramic layer adhesion.

In yet another aspect this invention comprises a process of forming unsintered metal/ferrite laminate magnet, comprising:

(a) forming at least one first opening in an metal sheet having a first surface and a second surface, (b) securing at least one dielectric layer to at least a portion of said first surface of said metal sheet, (c) securing at least one ceramic magnet layer containing at least one low temperature sintering aid to at least a portion of said at least one dielectric layer, (d) forming a second opening using said first opening as a guide, such that at least a portion of said second opening overlaps at least a portion of said first opening in said metal sheet, and thereby forming said unsintered metal/ferrite laminate magnet.

In still yet another aspect this invention comprises a process of forming a sintered metal/ferrite laminate magnet, comprising:

(a) forming at least one opening in an metal sheet having a first surface and a second surface, (b) securing at least one dielectric layer to at least a portion of said first surface of said metal sheet, (c) securing at least one ceramic magnet layer containing at least one low temperature sintering aid to at least a portion of said at least one dielectric layer, (d) forming at least one opening through said ceramic magnet layer and said dielectric layer, such that at least a portion of said opening overlaps at least a portion of said opening in said metal sheet, and sintering the same to form said sintered metal/ferrite laminate magnet.

In still another aspect this invention comprises a process of forming a ceramic-metallic magnet, comprising mixing at least one ceramic material, at least one metallic material and at least one low temperature sintering aid and sintering said mixture at a temperature of between about 400° C. and about 1000° C.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION OF THE INVENTION

Figure 1:
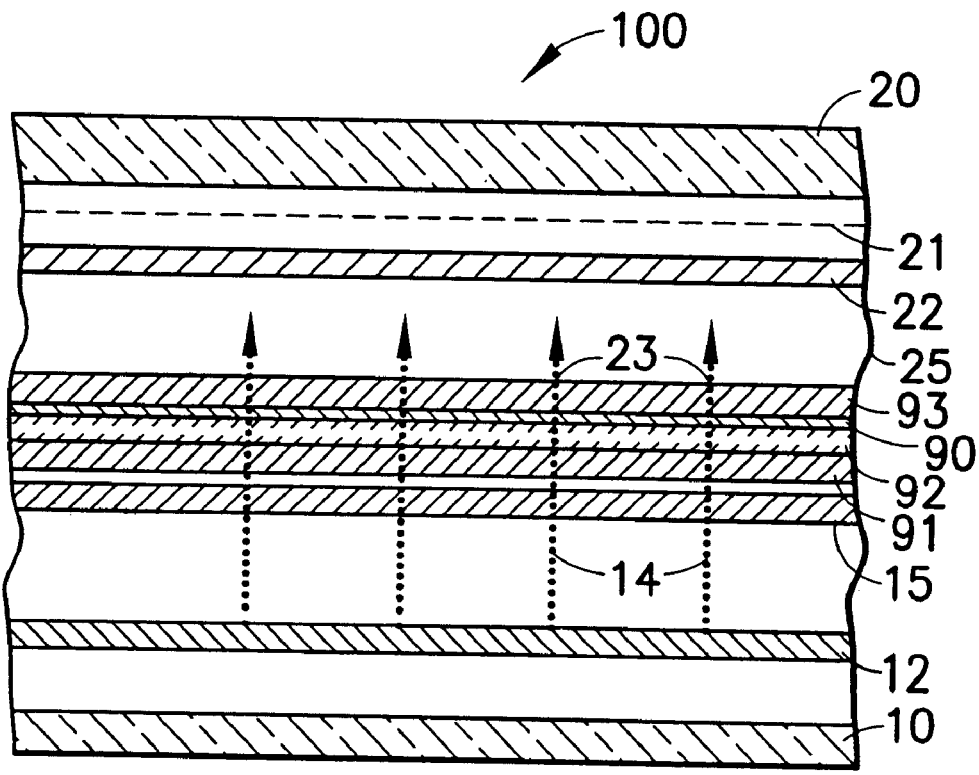
FIG. 1, illustrates a preferred embodiment of this invention where at least one magnetic-ceramic laminate directs at least one electron beam from a cathode.

In accordance with the present invention, there is provided an electron source comprising at least one cathode means and at least one magnetic-ceramic, sintered at lower temperature with use of sintering aids and laminated with grid electrodes. The magnets are perforated by at least one channel extending between opposite poles of the magnet, wherein each channel in the magnet can direct or guide electrons received from the cathode means into an electron beam towards a target with no possible overlap.

In a preferred embodiment of the present invention, the electron source comprises grid electrode means disposed between the cathode means and the ceramic magnets which were sintered using low temperature sintering aids, for controlling flow of electrons from the cathode means into the magnetic channels.

The magnetic channels are preferably disposed in the ceramic magnet in a two dimensional array of rows and columns. However, a person skilled in the art could also customize the dimensional array.

Preferably, the grid electrode means comprise a plurality of parallel row conductors and a plurality of parallel column conductors arranged orthogonally to, and insulated from, the row conductors, each channel being located at a different intersection of a row conductor and a column conductor.

The grid electrode means may be disposed on the surface of the cathode means facing the magnet. Alternatively, in the present invention the grid electrode means may be disposed on the surface of the magnet and sintered using low temperature sintering aids and facing the cathode means.

The laminate with magnet(s) preferably comprises ferrite. In some embodiments of the present invention, the magnet may comprise a ceramic material. In other embodiments of the present invention, the magnet may also comprise a binder. The binder may be organic or inorganic. Preferably, the binder comprises an inorganic glass composite, containing glass forming oxides for optimized properties in fabrication and use.

The present invention also extends to display devices and a computer system comprising: memory means; data transfer means for transferring data to and from the memory means; processor means for processing data stored in the memory means; and a display device comprising the electron source as hereinbefore described for displaying data processed by the processor means.

It will further be appreciated that the present invention extends to a print-head comprising an electron source as hereinbefore described. Still further, it will be appreciated that the present invention extends to document processing apparatus comprising, such as, a print-head, together with means for supplying data to the print-head to produce a printed record in dependence on the data.

The present invention in another embodiment is a triode device comprising: cathode means; a magnetic laminate perforated by at least a channel extending between opposite poles of the magnet wherein each channel forms electrons received from the cathode means into an electron beam; co-sintered grid electrode means disposed between the cathode means and the magnet for controlling flow of electrons from the cathode means into the channels; and, anode means disposed on the surface of the magnet remote from the cathode for accelerating electrons through the channels towards the glass plate containing phosphors.

The present invention is also a process for making an electron beam collimator, comprising: forming perforated metal plates, perforated green sheets of dielectric and ferrite with low temperature sintering aids containing compositions, forming metal electrode conductors and composite magnetic structure to produce a laminate with desired characteristics.

The process may comprise mixing the ferrite with low temperature sintering aids and with a binder prior to forming the magnetic structure. Preferably, the binder comprises glass particles.

The process may also comprise depositing anode means on a perforated face of the magnet(s).

Preferably, the process comprises control grid means on the face of the laminate remote from the face carrying the anode means.

At least one of the steps of forming the anode means and the steps of forming the control grid means may comprise photo-processing or chemical etching. Alternatively, plating, screen printing or decal transfer may be used for depositing anode means and control grid means.

The present invention could also be a process for making a display device comprising: making an electron source according to the process hereinbefore described; positioning a phosphor coated screen adjacent to the face of the magnet carrying the anode means; and, evacuating spaces between the cathode means and between the magnet, sintered at lower temperature using sintering aids, and the magnet and the screen.

The present invention could also be a process for addressing pixels of a display screen having a plurality of pixels, each pixel having successively first, second, and third sub-pixels in line, the process comprising: generating a plurality of electron beams, each electron beam corresponding to a different one of the pixels; and, deflecting each electron beam to repetitively address the sub-pixels of the corresponding pixel in the sequence second pixel, first pixel, second pixel, third pixel.

Referring now to the figures, such as, FIG. 1, a magnetic matrix display (MMD) 100, of the present invention is shown which comprises, a first or lower plate 10, such as, a glass plate 10, having at least one cathode 12, and a second or upper plate or screen 20, such as, a glass plate 20, having at least one coating of at least one phosphor pixel or dots or stripes 21. It is preferred that the phosphor coatings 21, are sequentially arranged red, green and blue phosphor coatings 21, facing the cathode 12. The phosphor coatings 21, are made from preferably high voltage phosphors. At least one anode layer 22, is disposed on or adjacent to the phosphor coating 21.

At least one composite magnetic plate or sheet 90, preferably made of ferrites with low temperature sintering aids, is disposed between the plates 10 and 20. The composite magnetic sheet 90, has a first or lower surface electrode 91, and an upper or second surface electrode 93, having a ceramic magnet layer 92, is perforated by a two dimension matrix of perforation or "pixel wells" 23. Electron beams 14, are channeled through the "pixel wells" 23. At least one bias 15, which is preferably near or on the first electrode 91, can be used to channel the electrons in the electron beam 14. A housing 25, contains and protects the different components of the MMD 100.

As stated earlier that typical sintering temperature for Barium or Strontium or Ba—Sr ferrites is above 1300° C., therefore those types of material would degrade this invention. Therefore, one has to find materials that would meet the needs of this invention, such as, a ferritic material which has a reduced sintering temperature. To obtain such materials one could involve liquid phase sintering (using sintering additives that will form a liquid phase around the required temperature), activated sintering (using additives in very low concentration that will improve the sintering kinetics), or increasing the sintering force by substantially reducing the ferrite particle size. After some analysis it seems that the first approach is the most versatile. The liquid phase forming systems can be binary or ternary oxide systems with eutectic compositions having melting points well below the required sintering temperature. For some applications it is possible to have more than three component systems, but it would be at the expense of more complicated phase equilibria considerations. However, there is a family of low melting binary or ternary oxide systems. Therefore, it is possible to choose low melting additive system(s) with neutral or benevolent chemical interactions with the ferrites. A neutral liquid phase sintering additive system will create a liquid well below the sintering temperature that will wet all the ferrite particles efficiently (close to zero contact angle), and densification of the particulate matrix through particle rearrangement, and solution/re-precipitation mechanisms, with very limited chemical interaction with the ferrite particles. However, a large volume fraction of such additives reduces the magnetic moment of the resulting matrix even if 100% densification is achieved. Similarly, a sintering additive system with benevolent interaction could react with the ferrite particles during the densification and potentially form ferrites of similar type and magnetic properties. This type of additive system allows one to add large amount of sintering additives (up to 20% by volume) without affecting the magnetic properties of the sintered body substantially. Thus the present invention takes advantage of both of these approaches to develop low temperature sintering additives for ferrites.

Figure 2:
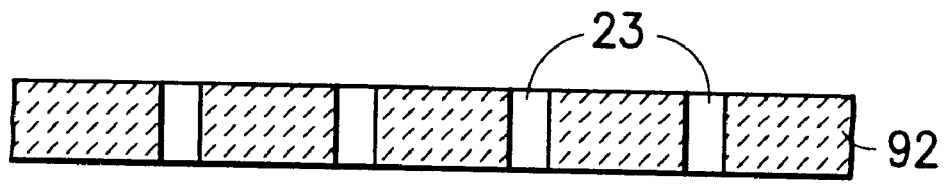
FIG. 2, illustrates a cross-sectional view of a ceramic-magnetic plate made according to the teachings of this invention.

FIG. 2, illustrates a cross-sectional view of a ceramic-magnetic plate 92, made according to the teachings of this invention, wherein the plate 92, has at least one low temperature sintering aid as one of the constituents of the plate 92.

As stated earlier, that in order to form the ceramic-magnetic layer 92, it is preferred that the right sintering aid candidates involve (a) choosing eutectic oxide liquid phases with melting point around or below 800° C., and (b) choosing oxide systems that will have at least one component of the ferrite matrix (Ba, Fe or Sr), and/or at least one ferrite forming component (Cu, Ni, Zn, etc.). This would ensure good wetting of the matrix powder particles (ferrites) by the liquid phase to give fast densification and also lead to little or no degradation of the magnetic properties once the densification has been completed (due to ferrite forming liquid).

A number of inventive sintering aid systems have been found to meet the above-mentioned criteria. These included mixtures of oxides of barium and copper (BaO—CuO), oxides of strontium and copper (SrO—CuO), oxides of copper and tellurium (CuO—TeO$_2$), oxides of bismuth and copper ($Bi_2O_3$—CuO), oxides of magnesium and tellurium (MgO—$TeO_2$), oxides of bismuth and strontium ($Bi_2O_3$—SrO), oxides of strontium and tellurium (SrO—$TeO_2$), oxides of strontium and vanadium pentoxide (SrO—$V_2O_5$), oxides of strontium and molybdnum (SrO—$MoO_3$), oxides of iron and vanadium ($Fe_2O_3$—$V_2O_5$), oxides of bismuth and zinc ($Bi_2O_3$—ZnO), oxides of bismuth and nickel ($Bi_2O_3$—NiO), oxides of bismuth and magnesium ($Bi_2O_3$—MgO) etc. and some of their ternary combinations. However, the preferred low temperature sintering aids are the eutectic compositions in mixtures of $Bi_2O_3$—ZnO, $Bi_2O_3$—NiO, and $Bi_2O_3$—CuO.

The eutectic composition additives of this invention were prepared by first mixing the individual oxides in correct proportions (obtained from the phase diagrams), the oxide mixtures were then calcined at temperatures of between about 0.6 to about 0.8 Tm (where Tm is the eutectic melting temperature in the system expressed in degree Kelvin). The calcination step was repeated once or twice (depending on the system), until a homogeneous eutectic mixture was obtained, and that there were no unreacted components remaining. The calcined mass was then ball-milled to reduce the particle size until there were no particles over about 20 microns. These sintering additive powders were then used, for example, about 10% by wt., for example, with Ba-Ferrite powder, and then ball milled for homogeneity. The Ba-Ferrite powders obtained with the sintering additives were subsequently used for making the ceramic-magnetic layer 92, using low temperature sintering.

Different combinations were used to make the ceramic-magnetic layer 92, of this invention, and it was discovered that it is possible to obtain better than 96% density by sintering at around 980° C., for example, for about 4 Hr, for all of the three preferred systems, namely $Bi_2O_3$—ZnO, $Bi_2O_3$—NiO, and $Bi_2O_3$—CuO. Similar densities were also obtained with sintering the compositions for the ceramic-magnetic material 92, at around 880° C., however, the sintering time had to be increased, for example, to about 12 Hr.

Further improvements in the formation of the ceramic-magnetic layer 92, could also be made by adding, for example, about 5% by wt. of $Cr_2O_3$ and/or $TiO_2$, to promote metal to magnetic-ceramic adhesion during sintering.

Data on magnetic hysterisis for such low temperature sintered magnetic-ceramic material 92, was obtained using SHE SQUID magnatometer, and it clearly showed that the coercive field Hc of above 3100 gauss could be obtained using these sintered materials.

Metal/magnetic-ceramic laminate 90, could also be obtained by forming at least one opening 23, in a metal sheet and securing at least one non-magnetic dielectric layer, and/or at least one ferrite with low temperature sintering additives layer, to the metal sheet. One could then form at least one opening 23, in the dielectric layer and/or the ferrite layer, such as, by punching. The opening 23, would correspond to at least one opening 23, in the secured metal sheet to obtain an unsintered sub-laminate structure. One could then sinter the metal/dielectric/ferrite layer assembly with holes to full densification. One could subsequently build metal electrodes on the top and bottom surfaces of the sintered laminate.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A process of forming unsintered metal/ferrite laminate magnet, comprising:
    (a) forming at least one opening in a metal sheet having a first surface and a second surface,
    (b) securing at least one dielectric layer to at least a portion of said first surface of said metal sheet,
    (c) securing at least one ceramic magnet layer containing at least one low temperature sintering aid to at least a portion of said at least one dielectric layer,
    (d) forming at least one opening through said ceramic magnet layer and said dielectric layer, such that at least a portion of said opening overlaps at least a portion of said opening in said metal sheet, and thereby forming said unsintered metal/ferrite laminate magnet.

2. The process of claim 1, wherein said low temperature sintering aid is selected from a group consisting of mixtures of oxides of barium and copper, oxides of strontium and copper, oxides of copper and tellurium, oxides of bismuth and copper, oxides of magnesium and tellurium, oxides of bismuth and strontium, oxides of strontium and tellurium, oxides of strontium and vanadium pentoxide, oxides of strontium and molybdenum, oxides of iron and vanadium, oxides of bismuth and zinc, oxides of bismuth and nickel, and oxides of bismuth and magnesium.

3. The process of claim 1, wherein said low temperature sintering aid is selected from a group consisting of mixtures of $Bi_2O_3$—ZnO, $Bi_2O_3$—NiO, and $Bi_2O_3$—CuO.

4. The process of claim 1, wherein said at least one opening in said metal sheet is formed by applying at least one photoresist on said metal sheet, exposing and developing said photoresist to form a pattern of holes, and using said pattern of holes to subsequently etch said metal sheet to form said at least one opening in said metal sheet.

5. The process of claim 1, wherein said at least one opening in said metal sheet is formed by means selected from a group consisting of laser beam, electron beam or mechanical means.

6. The process of claim 1, wherein said at least one ceramic magnet layer is formed by mixing ferritic material with glass particles, low temperature sintering materials/aids, organic binders and solvents to form a ferritic paste, slurry or powder; and applying said ferritic paste, slurry or powder to said at least one dielectric layer to form said at least one ceramic magnet layer.

7. The process of claim 1, wherein said at least one ceramic magnet layer is formed by mixing ferritic material with glass particles, low temperature sintering materials/aids, organic binders and solvents to form a ferritic paste, slurry or powder; casting and drying said ferritic paste, slurry or powder, into a ferritic green sheet; and blanking said ferritic green sheet to form said at least one ceramic magnet layer.

8. The process of claim 1, wherein said at least one dielectric layer is formed by mixing at least one dielectric material to form a dielectric slurry; mixing, casting and drying said dielectric slurry into a dielectric green sheet; and blanking said dielectric green sheet to form said at least one dielectric layer.

9. The process of claim 1, wherein said at least one dielectric layer is formed by mixing at least one dielectric material to form a dielectric slurry, paste or powder, and wherein said dielectric slurry, paste or powder is deposited onto said metal sheet using at least one method selected from a group consisting of spraying, screening and dry-pressing.

10. The process of claim 1, wherein said at least one dielectric layer is formed by mixing dielectric material to form a dielectric slurry, paste or powder, and wherein said dielectric slurry, paste or powder is integrated onto said metal sheet using at least one method selected from a group consisting of spraying, casting, screening and dry-pressing.

11. The process of claim 1, wherein said at least one ceramic magnet layer containing at least one low temperature sintering aid is secured to said at least one dielectric layer by application of heat and/or pressure.

12. The process of claim 1, wherein said at least one dielectric layer is secured to said first surface of said metal sheet by application of heat and/or pressure.

13. The process of claim 1, wherein said at least one dielectric layer is secured to said first surface of said metal sheet by using at least one adhesive material.

14. The process of claim 1, further comprising the steps of sintering said metal/ferrite laminate magnet, thereby forming a sintered metal/ferrite laminate magnet, and securing at least one electrically conductive metal to said sintered metal/ferrite laminate magnet.

15. The process of claim 1, wherein at least one anode is secured to said unsintered metal/ferrite laminate magnet.

16. The process of claim 15, wherein said at least one anode is formed using a process selected from a group consisting of photolithography, screen printing, decal transfer, plating, or adhesive patterning, followed by dry deposition of at least one electrically conductive medium.

17. The process of claim 1, wherein at least one control grid is secured to said unsintered metal/ferrite laminate magnet.

18. The process of claim 17, wherein said at least one control grid is formed using a process selected from a group consisting of photolithography, screen printing, decal transfer, plating, or adhesive patterning, followed by dry deposition of at least one electrically conductive medium.

19. The process of claim 1, wherein cross-section of said at least one open ing in said metal sheet is selected from a group consisting of circular cross-section, polygonal cross-section, triangular cross-section or rectangular cross-section.

20. The process of claim 1, wherein said opening in said ceramic magnet layer containing at least one low temperature sintering aid and said dielectric layer is formed by partially sintering said ceramic magnet layer and said dielectric layer and using a pressurized impinging medium to open said at least one opening.

21. The process of claim 1, wherein at least two of said unsintered metal/ferrite laminate magnet are secured to each other such that said metal sheet sandwiches said dielectric material.

22. The process of claim 1, wherein said metal sheet acts as a stiffener to prevent any distortion of said laminate magnet.

23. The process of claim 1, wherein said metal sheet is selected from a group consisting of nickel, palladium, stainless steel, silver and gold.

24. The process of claim 1, wherein said metal sheet is co-sintered in an oxidizing atmosphere.

25. The process of claim 1, wherein said metal sheet is stable at temperatures up to about 1,000° C.

26. The process of claim 1, wherein said low temperature sintering is done at a temperature of greater than about 400° C.

27. The process of claim 1, wherein said low temperature sintering aid is selected from a group consisting of mixtures of BaO and CuO, SrO and CuO, CuO and $TeO_2$, $Bi_2O_3$ and CuO, MgO and $TeO_2$, $Bi_2O_3$ and SrO, SrO and $TeO_2$, SrO and $V_2O_5$, SrO and $MoO_3$, $Fe_2O_3$ and $V_2O_5$, $Bi_2O_3$ and ZnO, $Bi_2O_3$ and NiO, and $Bi_2O_3$ and MgO.

28. A process of forming unsintered metal/ferrite laminate magnet, comprising:
  (a) forming at least one first opening in a metal sheet having a first surface and a second surface,
  (b) securing at least one dielectric layer to at least a portion of said first surface of said metal sheet,
  (c) securing at least one ceramic magnet layer containing at least one low temperature sintering aid to at least a portion of said at least one dielectric layer,
  (d) forming a second opening in said at least one dielectric layer and said at least one ceramic magnetic layer using said first opening as a guide, such that at least a portion-of said second opening overlaps at least a portion of said first opening in said metal sheet, and thereby forming said unsintered metal/ferrite laminate magnet.

29. A process of forming a sintered metal/ferrite laminate magnet, comprising:
  (a) forming at least one opening in a metal sheet having a first surface and a second surface,
  (b) securing at least one dielectric layer to at least a portion of said first surface of said metal sheet,
  (c) securing at least one ceramic magnet layer containing at least one low temperature sintering aid to at least a portion of said at least one dielectric layer,
  (d) forming at least one opening through said ceramic magnet layer and said dielectric layer, such that at least a portion of said opening overlaps at least a portion of said opening in said metal sheet, and
  (e) sintering the same to form said sintered metal/ferrite laminate magnet.

* * * * *